(12) United States Patent
Bestgen et al.

(10) Patent No.: US 8,833,416 B2
(45) Date of Patent: Sep. 16, 2014

(54) INNER TUBE AND METHOD OF PRODUCING SUCH A TUBE

(75) Inventors: Luc Bestgen, Chatel-Guyon (FR); Christian Bidet, Riom (FR)

(73) Assignees: Michelin Recherche et Techniques S.A., Grangers-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 545 days.

(21) Appl. No.: 12/996,626

(22) PCT Filed: Jun. 5, 2009

(86) PCT No.: PCT/EP2009/056937
§ 371 (c)(1),
(2), (4) Date: Feb. 18, 2011

(87) PCT Pub. No.: WO2009/147236
PCT Pub. Date: Dec. 10, 2009

(65) Prior Publication Data
US 2011/0132513 A1  Jun. 9, 2011

(30) Foreign Application Priority Data

Jun. 6, 2008   (FR) ...................................... 08 53752

(51) Int. Cl.
*B60C 5/02* (2006.01)
*B29D 23/24* (2006.01)
(52) U.S. Cl.
USPC ......... 152/510; 152/511; 428/34.1; 428/35.7; 428/36.8
(58) Field of Classification Search
USPC ........ 152/510, 511, 512; 428/34.1, 35.7, 36.8
See application file for complete search history.

(56) References Cited

U.S. PATENT DOCUMENTS

| | | | |
|---|---|---|---|
| 1,440,553 A * | 1/1923 | Privett | ........................ 152/506 |
| 2,203,124 A | 6/1940 | Barry | |
| 2,325,354 A | 7/1943 | Wyman | |
| 2,535,120 A | 12/1950 | Cady et al. | |
| 6,571,845 B1 | 6/2003 | Caretta et al. | |

FOREIGN PATENT DOCUMENTS

| | | | |
|---|---|---|---|
| BE | 364 568 | | 11/1929 |
| EP | 151093 | * | 8/1985 |
| FR | 543 230 | | 8/1922 |
| JP | 2003-146031 | * | 5/2003 |
| JP | 2003-320823 | * | 11/2003 |
| JP | 2005-324569 | * | 11/2005 |

* cited by examiner

*Primary Examiner* — Justin Fischer
(74) *Attorney, Agent, or Firm* — Cozen O'Connor (57) ABSTRACT

An inner tube having a closed polymeric envelope with a primary surface comprising means allowing compression of the polymeric envelope when inflated under the normal conditions of use of the assembled unit. A radially outer part has a meridian curvature such that the ratio of the average radius of its meridian curvature to the radius of a circle of perimeter equal to the meridian perimeter of the primary surface of the polymeric envelope is greater than 2.5 and preferably greater than 10, when the inner tube is inflated to a pressure of 2000 pascals and the ratio of the average radius of the meridian curvature of the side parts to the radius of a circle of perimeter equal to the meridian perimeter of the primary surface of the polymeric envelope is greater than 2.5 and preferably greater than 10, when the inner tube is inflated to a pressure of 2000 pascals.

13 Claims, 7 Drawing Sheets

INNER TUBE AND METHOD OF PRODUCING SUCH A TUBE

RELATED APPLICATIONS

This is a U.S. national stage of application No. PCT/EP2009/056937, filed on Jun. 5, 2009.

This patent application claims the priority of French patent application Ser. No. 08/53752 filed Jun. 6, 2008 the disclosure content of which is hereby incorporated by reference.

FIELD OF THE INVENTION

The invention relates to an inner tube intended for an assembled unit that also consists of a wheel rim and a tire. The invention relates more specifically to inner tubes which, particularly in the event of a puncture when the vehicle is moving, allow the user to continue his journey.

Although not limited to such applications, the invention will be presented more specifically with reference to inner tubes intended for assembled units for two-wheeled vehicles, particularly bicycles.

BACKGROUND OF THE INVENTION

Ordinary assembled units of the tube type, meaning an inner tube, consist of a wheel rim, which among other things comprises rim flanges, a tire, and an inner tube whose function is to retain the pressure and keep the tire on the rim. In the event of a puncture, these assembled units are simple to repair. A repair may consist in identifying the source of the leak of air and therefore a hole in the inner tube and sealing it with a repair patch. Such a repair is quite simple and can be done with very little experience. Another way is to replace the punctured inner tube with a new inner tube, provided the user has one available.

When the user is travelling and does not have either repair means or a replacement inner tube available, it is desirable for him or her to be able to return home or reach a repair place by continuing to travel without having to do anything directly to the assembled unit.

This scenario is particularly desirable for users who use a bicycle every day to go to work for example. This type of user is not usually dressed ideally and has not got time to set about repair work him or herself. Moreover, the complexity of certain bicycles, specifically the rear wheels with for example derailleurs built into the hub, often makes a repair a very difficult task.

Solutions have already been proposed to users to mitigate the inconvenience of this type of incident. Examples of these are solutions that limit the risk of puncture. For example, tires have been provided which comprise under the tread a thicker layer of rubber, or protective foams that form a barrier against potential punctures.

These solutions can certainly improve the situation but remain limited to preventing incidents affecting the tread. Punctures by perforations in the sidewalls of the tire cannot for example be avoided with this type of product.

Moreover, the comfort and performance in terms of rolling resistance are not equivalent to those of a normal tire.

The use of solid tires whose special feature of course is that they cannot be punctured has already been proposed. This type of solution is interesting but reduces the properties of comfort or wear and often complicates the fitting of the assembled unit.

Solutions relating to the inner tube have also already been proposed. Document U.S. Pat. No. 2,535,120 discloses for example an inner tube comprising raised forms consisting of humps on its outer surface which when the inner tube is pressurized inside an assembled unit limit or prevent the stretching of said surface or even keep a surface in compression. Thus, when an accidental perforation of the inner tube occurs, the condition of the surface produced in this way by the presence of humps causes the hole created by the perforation to be instantly "sealed".

Tests done on inner tubes for assembled units designed for bicycles have shown that such a solution is of only relative efficacy, depending in particular on the location of the puncture in the surface of the inner tube.

Specifically, the inventors have demonstrated that the formation of the humps on a bicycle inner tube combines a toroidal surface with raised forms, having in particular a small radius of curvature, and, since the shape of said reliefs is defined identically for all of said reliefs, the connections between them and the toroidal surface vary depending on the particular location of said reliefs on the surface. As a consequence, certain connecting regions inevitably create regions of stretching, which explains the ineffectiveness of such an inner tube in certain cases where perforation occurs in said stretched regions. One solution which would consist in defining the profile of each hump based on its position on the toroidal surface could be used to avoid stretching certain connecting regions, but is out of the question from an industrial point of view.

There also exist devices that take the form of an aerosol and that allow a substance to be introduced into the inner tube to seal a puncture. These solutions, which can also be used preventively, are of course limited to certain types of minor damage to the tire and inner tube.

The circumferential direction of the assembled unit, or longitudinal direction, is the direction corresponding to the periphery of the assembled unit and is defined by the direction in which the assembled unit rolls.

The transverse or axial direction of the assembled unit is parallel to the axis of rotation of the assembled unit.

The radial direction is a direction that intersects the axis of rotation of the assembled unit and is perpendicular to it.

The axis of rotation of the assembled unit is the axis about which it rotates in normal use.

A radial or meridian plane is a plane containing the axis of rotation of the assembled unit.

The circumferential median plane, or equatorial plane, is a plane perpendicular to the axis of rotation of the assembled unit and which divides the assembled unit into two halves.

SUMMARY OF THE INVENTION

One object of the invention is to provide an inner tube intended for an assembled unit for a bicycle that will enable a user to continue to travel when said inner tube has suffered a puncture caused for example by a foreign body, whether the foreign body remains in place or not.

This object has been achieved according to one embodiment of the invention with an inner tube for an assembled unit, said tube having a closed polymeric envelope with a primary surface comprising a valve and, on at least part of said primary surface, means allowing compression in at least the circumferential direction of said part of the polymeric envelope when inflated under the normal conditions of use of the assembled unit, one or more parts of the primary surface of the polymeric envelope having a meridian curvature such that the ratio of the average radius of its meridian curvature to the radius of a circle of perimeter equal to the meridian perimeter of the primary surface of the polymeric envelope is greater than 2.5 and preferably greater than 10, when the inner tube is inflated to a pressure of 2000 pascals and the sum of the curvilinear lengths in a meridian plane of said one or more parts being equal to 20% of the total curvilinear length of said primary surface of the polymeric envelope in said meridian plane.

The normal conditions of inflation are 2 bar for a tire for a mountain bike (MTB), 3 bar for a tire for a city road bicycle and 7 bar for a tire for a sports road bicycle. For a motorized vehicle, the normal conditions of inflation are the pressures recommended by the manufacturer.

The primary surface of the inner tube is that surface of the inner tube on which are formed the means allowing compression in at least the circumferential direction of said part of the polymeric envelope when inflated under the normal conditions of use of the assembled unit, and which take the form for example of depressions and/or humps.

The average radius of the meridian curvature of a part of the primary surface of the polymeric envelope corresponds to the average of the radii measured on the curve formed by said part in a meridian plane, along a curvilinear length less than the least out of 37% of the radius of the circle of perimeter equal to the total curvilinear length of the primary surface of the polymeric envelope in said meridian plane, and 75% of the curvilinear length of said part, the centre of said curvilinear length being on the centre of the curvilinear length of said part. The radii are preferably measured along a curvilinear length less than or equal to the least out of 25% of said radius and 50% of said curvilinear length of said part. Each of the radii themselves can be measured from a profile made by a variety of means known to those skilled in the art such as a least-squares method or from a circle passing through three points.

According to an embodiment of the invention, the primary surface of the polymeric envelope consists of at least two parts, each having a curvilinear length in a meridian plane, the sum of said curvilinear lengths being greater than or equal to 25% of the total curvilinear length of said primary surface of the polymeric envelope in said meridian plane, the meridian curvature of each of said parts being such that the ratio of the average radius of said meridian curvature to the radius of a circle of perimeter equal to the meridian perimeter of the primary surface of the polymeric envelope is greater than 2.5 and preferably greater than 10, when the inner tube is inflated to a pressure of 2000 pascals.

According to an embodiment of the invention, the primary surface of the polymeric envelope has at least three parts, each having a curvilinear length in a meridian plane, the sum of said curvilinear lengths being greater than or equal to 36% of the total curvilinear length of said primary surface of the polymeric envelope in said meridian plane, the meridian curvature of each of said parts being such that the ratio of the average radius of said meridian curvature to the radius of a circle of perimeter equal to the meridian perimeter of the primary surface of the polymeric envelope is greater than 2.5 and preferably greater than 10, when the inner tube is inflated to a pressure of 2000 pascals.

The number of parts of the primary surface of the polymeric envelope whose meridian curvature of each of said parts is such that the ratio of the average radius of said meridian curvature to the radius of a circle of perimeter equal to the meridian perimeter of the primary surface of the polymeric envelope is greater than 2.5 and preferably greater than 10, when the inner tube is inflated to a pressure of 2000 pascals increases with the size of the inner tube. An inner tube for a bicycle advantageously has one to three parts thus defined. A larger inner tube for a motorcycle, for example, will advantageously comprise five or even seven parts thus defined so that the size of the means allowing compression in at least the circumferential direction of said part of the polymeric envelope when inflated under the normal conditions of use of the assembled unit remains reasonable.

An advantageous variant of the invention provides that the primary surface of the polymeric envelope has symmetry in a meridian plane about an equatorial plane.

In a preferred embodiment of the invention, the inner tube for an assembled unit, said inner tube having a closed polymeric envelope with a primary surface comprising a valve and, on at least part of its surface, means allowing compression in at least the circumferential direction of said part of the polymeric envelope when inflated under the normal conditions of use of the assembled unit, has a primary surface of the polymeric envelope consisting of at least three parts, each having a curvilinear length in a meridian plane, greater than or equal to 12% of the total curvilinear length of said primary surface of the polymeric envelope in said meridian plane, a radially outer part having a meridian curvature such that the ratio of the average radius of its meridian curvature to the radius of a circle of perimeter equal to the meridian perimeter of the primary surface of the polymeric envelope is greater than 2.5 and preferably greater than 10 when the inner tube is inflated to a pressure of 2000 pascals, and the average ratio of the meridian curvature of the side parts to the radius of a circle of perimeter equal to the meridian perimeter of the primary surface of the polymeric envelope is greater than 2.5 and preferably greater than 10 when the inner tube is inflated to a pressure of 2000 pascals.

Advantageously in this preferred embodiment of the invention, the two side parts each extend axially the radially outer part and are connected to said outer part by connecting regions having a radius of curvature of less than 6 mm.

This object is also achieved in a preferred embodiment of the invention with an inner tube for an assembled unit, said inner tube consisting of having a closed polymeric envelope with a primary surface comprising a valve and, on at least part of said primary surface, means allowing compression in at least the circumferential direction of said part of the polymeric envelope when inflated under the normal conditions of use of the assembled unit, the primary surface of the polymeric envelope consisting of at least three parts, each having a curvilinear length in a meridian plane greater than or equal to 12% of the total curvilinear length of said primary surface of the polymeric envelope in said meridian plane, a radially outer part being extended axially by two side parts and the two side parts being connected to said outer part by connecting regions having a radius of curvature of less than 6 mm, when the inner tube is inflated to a pressure of 2000 pascals.

Advantageously in the preferred embodiment of the invention, the two side parts have identical curvilinear lengths in a meridian plane.

Tests have been performed on inner tubes according to the invention and on inner tubes as described previously comprising raised hump-type forms on their outer surfaces but with a more traditional toroidal form. These tests have demonstrated that the inner tubes according to the invention are more effective regardless of the type of perforating object and regardless of the location of the perforation in the surface of the inner tube. In other words, the features of the inner tube according to the invention eliminate the stretching of the polymeric envelope that tends to occur at the connecting regions between means allowing compression of the polymeric envelope, such as humps for example, and the primary surface of the polymeric envelope.

Since inner tubes are often used for several sizes of tire, the invention provides compression in at least the circumferential direction of said part of the polymeric envelope when inflated under the normal conditions of use of the assembled unit and can allow compression in the axial direction depending on the size of the tire of the assembled unit in which it is fitted. The reason for this is that it is common for several tires of different cross section to be fitted to a given rim; usually a single inner tube can be used in combination with these different tires.

In a preferred variant of the invention, the primary surface of the polymeric envelope comprises means allowing compression in at least the circumferential direction when inflated under the normal conditions of use of the assembled unit on the radially outer part. In this variant of an embodiment of the invention, compression in at least the circumferential direction of the polymeric envelope is obtained in a region corresponding to at least part of the tread.

In another variant of the invention, the primary surface of the polymeric envelope comprises means allowing compression in at least the circumferential direction when inflated under the normal conditions of use of the assembled unit on the two side parts. In this other variant of an embodiment of the invention, compression in at least the circumferential direction of the polymeric envelope is obtained in a region corresponding to at least part of the sidewalls of the tire. The inventors have been able to demonstrate that besides an effect on potential perforations of these side parts, this variant of the invention allows better fitting of the assembled unit, particularly by preventing pinching of the inner tube leading to perforations of the polymeric envelope during fitting. The inventors link this result to a modified stiffness of the side parts due to the presence of these means. They have shown among other things that the decision as to how these means are distributed on the side parts influences the results in terms of fittability.

The invention further provides for the two variants described above to be combined by bringing together means allowing compression in at least the circumferential direction when inflated under the normal conditions of use of the assembled unit on the radially outer part and on the two side parts. In these variants of the invention, the means can be different in their forms and distributions on the radially outer part and on the two side parts, where the expected effect can differ.

In a first embodiment of the invention, the means allowing compression in at least the circumferential direction of a part of the polymeric envelope when inflated under the normal conditions of use of the assembled unit are raised forms, such as humps, above the primary surface.

In a second embodiment of the invention, the means allowing compression in at least the circumferential direction of a part of the polymeric envelope when inflated under the normal conditions of use of the assembled unit are sunken forms below the primary surface.

In other embodiments of the invention, the means allowing compression in at least the circumferential direction of a part of the polymeric envelope when inflated under the normal conditions of use of the assembled unit combine raised forms and sunken forms.

According to an embodiment of the invention, the radially outer part of the primary surface of the polymeric envelope has a curvilinear length greater than or equal to 18% and preferably greater than or equal to 21% of the total curvilinear length of the primary surface of the polymeric envelope. Also advantageously, the sum of the radially outer part of the primary surface of the polymeric envelope and of the two connecting regions connecting said radially outer part to the side parts has a curvilinear length greater than or equal to 22% and preferably greater than or equal to 27% of the total curvilinear length of the primary surface of the polymeric envelope. Such embodiments according to the invention give a radially outer part of the polymeric envelope that corresponds to the whole of the tread surface in which the majority of incidents causing puncturing of the inner tube occur. The shape of the means allowing compression in at least the circumferential direction of a part of the polymeric envelope when inflated under the normal conditions of use of the assembled unit can then advantageously be adapted so that its axial dimension is optimized to correspond optimally to the tread width.

This latter embodiment of the invention is particularly advantageous when means allowing compression of the polymeric envelope when inflated under the normal conditions of use of the assembled unit are formed only on this radially outer part of the polymeric envelope. This embodiment is also advantageous when the side parts also comprise such means but intended for another function such as that of improving fittability and which may then be formed in another way that may be less effective against perforations by foreign bodies during travel.

Another aspect of the invention provides a method of producing an inner tube for an assembled unit.

According to this aspect of the invention, the method of producing an inner tube for an assembled unit, said inner tube having a closed polymeric envelope comprising a valve, comprises a first step of making a polymeric tube by extrusion, a second step of forming a closed envelope defining a primary surface by butting the two ends of the tube, a third step of moulding the polymeric envelope obtained at the end of the second step, and in the course of the third step the mould conferring on the polymeric envelope a shape such that:

one or more parts of the primary surface of the polymeric envelope have a meridian curvature such that the ratio of the average radius of its meridian curvature to the radius of a circle of perimeter equal to the meridian perimeter of the primary surface of the polymeric envelope is greater than 2.5 and preferably greater than 10, when the inner tube is inflated to a pressure of 2000 pascals, the sum of the curvilinear lengths in a meridian plane of said one or more parts is greater than or equal to 20% of the total curvilinear length of said primary surface of the polymeric envelope in said meridian plane, and said one or more parts have means allowing compression in at least the circumferential direction of said part of the primary surface of the polymeric envelope when inflated under the normal conditions of use of the assembled unit.

In a preferred embodiment of the invention, the method of producing an inner tube for an assembled unit, said inner tube having a closed polymeric envelope comprising a valve, comprises a first step of making a polymeric tube by extrusion, a second step of forming a closed envelope defining a primary surface by butting the two ends of the tube, a third step of moulding the polymeric envelope obtained at the end of the second step, and in the course of the third step the mould conferring on the polymeric envelope a shape such that:

said primary surface of the polymeric envelope has at least three parts, each having a curvilinear length in a meridian plane greater than or equal to 12% of the total curvilinear length of said primary surface of the polymeric envelope in said meridian plane, at least one radially outer part has means allowing compression in at least the circumferential direction of said part of the primary surface of the polymeric envelope when inflated under the normal conditions of use of the assembled unit, the radially outer part has a meridian curvature such that the ratio of the average radius of its meridian curvature to the radius of a circle of perimeter equal to the meridian perimeter of the primary surface of the polymeric envelope is greater than 2.5 and preferably greater than 10, when the inner tube is inflated to a pressure of 2000 pascals, two side parts have identical curvilinear lengths in a meridian plane, and the ratio of the average radius of the meridian curvature of the side parts to the radius of a circle of perimeter equal to the meridian perimeter of the primary surface of the polymeric envelope is greater than 2.5 and preferably greater than 10, when the inner tube is inflated to a pressure of 2000 pascals.

Advantageously according to an embodiment of the invention, the mould consists of a cylindrical wall extended at the sides by two hoops and closed by a radially inner part.

In a variant of an embodiment of the invention, means allowing compression in at least the circumferential direction of a part of the polymeric envelope when inflated under the normal conditions of use of the assembled unit are raised forms such as humps above the primary surface. The mould therefore has corresponding sunken forms to form these humps on the polymeric envelope.

In another variant of an embodiment of the invention, means allowing compression in at least the circumferential direction of a part of the polymeric envelope when inflated under the normal conditions of use of the assembled unit are sunken forms below the primary surface. The mould therefore has corresponding raised forms to form these sunken forms in the polymeric envelope.

In a final variant of the invention, raised forms, such as humps and sunken forms, can be combined.

Advantageously again according to an embodiment of the invention, the connecting regions between the radially outer part and the side parts have a radius of curvature of less than 6 mm.

BRIEF DESCRIPTION OF THE DRAWINGS

Other details and advantageous features of the invention will become apparent hereinafter in the description of an illustrative embodiment of the invention, referring to FIGS. 1 to 7 which show.

DETAILED DESCRIPTION OF THE DRAWINGS

In order that the figures may be understood more clearly, they are not shown to scale.

Figure 1:
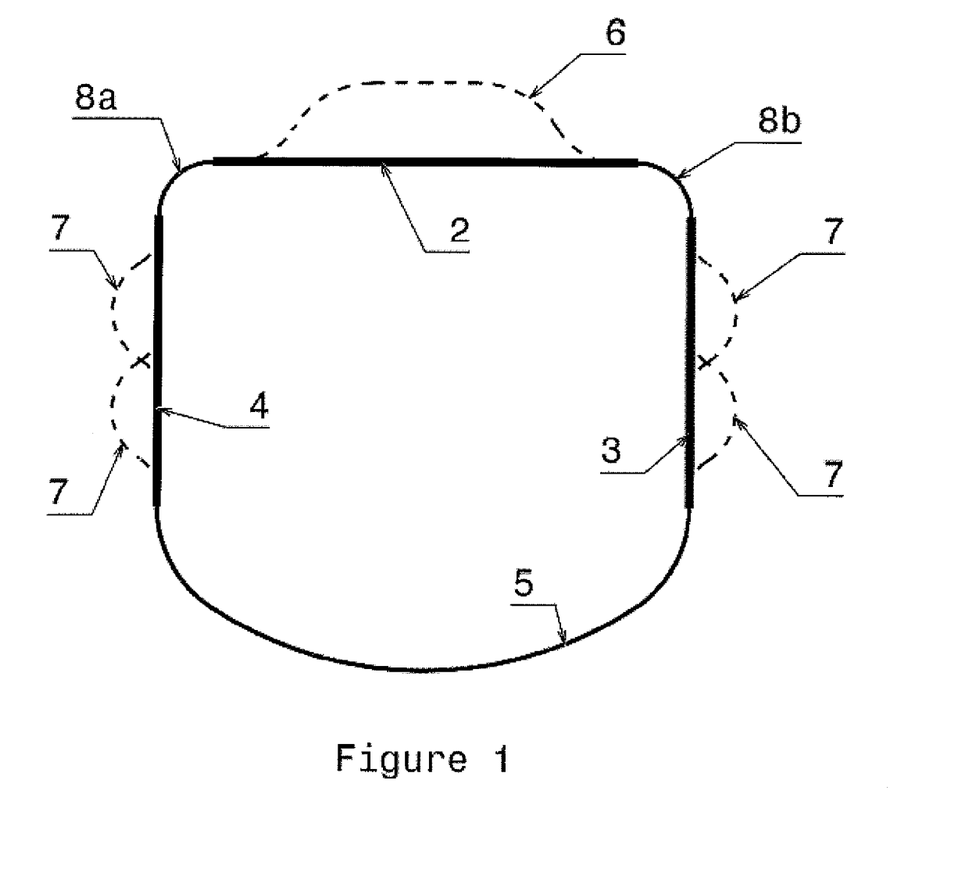
FIG. 1, a diagram of a partial view in radial section of an inner tube according to an embodiment of the invention, FIG. 2a, a diagram of a partial perspective view of the inner tube from FIG. 1, FIG. 2b, a diagram of a partial perspective view of an inner tube in another embodiment of the invention, FIG. 3, a diagram of a partial view in radial section of an ordinary inner tube, FIG. 4, a diagram of a partial perspective view of the inner tube from FIG. 3, FIG. 5, a diagram of a partial view in radial section of an inner tube of ordinary shape, with humps, and FIG. 6, a diagram of a partial perspective view of the inner tube from FIG. 5.

FIG. 1 shows diagrammatically a view in radial section of an inner tube 1 for a size 37/622 bicycle tire. FIG. 1 illustrates the inner tube 1 inside the manufacturing mould.

Figure 2A:
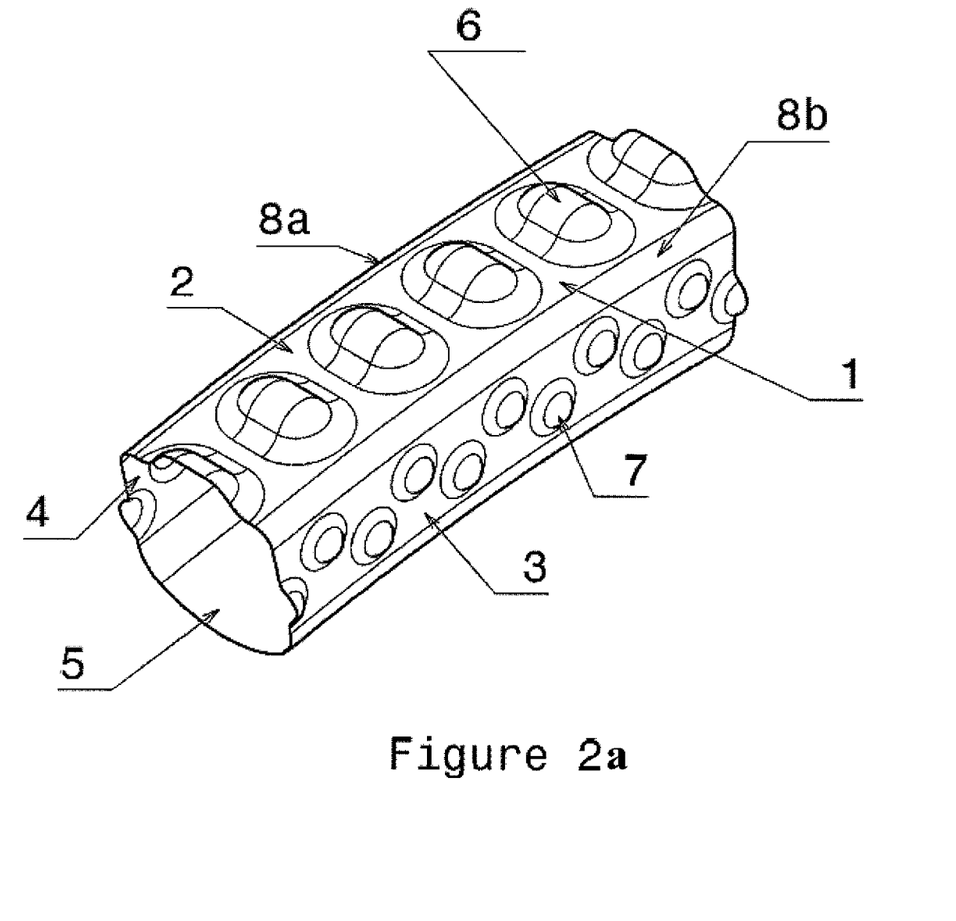

FIG. 2a shows diagrammatically a partial perspective view of the inner tube from FIG. 1. In FIG. 2a the inner tube is inflated to a pressure of 2000 pascals. This low pressure ensures that the shape of the inner tube conferred inside the mould is not totally deformed.

As explained before, the inner tube is made by a method involving several steps. During an initial step a polymeric tube is extruded. During a second step a closed envelope consisting of a primary surface is formed by butting the two ends of the tube. And during a third step the resulting envelope is moulded to give it the shape as defined by the invention.

The primary surface is thus composed of six parts 2, 3, 4, 5, 8a and 8b.

The figures show that the radially outer part 2 is connected to each of the side parts 3, 4 by the parts 8a, 8b which form connecting regions with a radius of curvature of less than 6 mm. In FIG. 1, which corresponds to the shape of the inner tube inside the mould, this radius of curvature is 2.6 mm.

The upper part formed by the radially outer part 2 and parts 8a and 8b has a curvilinear length of 24.1 mm, i.e. 28% of the total curvilinear length of 87 mm of said primary surface of the polymeric envelope. The radially outer part 2 itself has a curvilinear length of 19.2 mm, i.e. 22% of the total curvilinear length of said primary surface of the polymeric envelope. On part 2 of this radially outer part, humps 6 are moulded to allow compression in at least the circumferential direction of said part of the primary surface of the polymeric envelope when inflated under the normal conditions of use of the assembled unit incorporating the inner tube 1 and consisting also of a wheel rim and a tire (not shown in the figures). The humps 6 are made with dimensions on the radially outer part 2 corresponding to a length in the meridian direction of 17.3 mm and a width in the circumferential direction of 12.4 mm. 144 humps 6 are thus produced on the periphery of the radially outer part 2. The humps 6 are of a generally cylindrical shape extended around their periphery by a connecting region where the radially outer part 2 meets the primary surface. During moulding, this part 2 corresponds, as FIG. 1 shows, to a cylindrical surface and the connecting regions can be defined simply without the risk of stretched regions developing on the surface of said radially outer part during inflation inside an assembled unit under normal conditions, the smoothness of the joins between the humps 6 and the primary surface ensuring a smooth spreading out of the polymeric envelope on the inner surface of the tire. As the figures show, the dimensions of these humps 6, especially their length in the meridian direction, are intended to occupy as much as possible of the axial width of the radially outer surface 2, which in turn is intended to correspond approximately to the width of the tire tread of the assembled unit.

In accordance with the invention, the inner tube is inflated to a pressure of 2000 pascals, and therefore the radially outer part 2 has a meridian curvature with an average radius of 152 mm. Under the same conditions of inflation, the radius of the circle of perimeter equal to the average meridian perimeter of the primary surface of the envelope is equal to 13.8 mm. The ratio of the average radius of its meridian curvature to the radius of a circle of perimeter equal to the average meridian perimeter of the primary surface of the polymeric envelope is thus equal to 11 and therefore greater than 10, when the inner tube is inflated to a pressure of 2000 pascals.

The primary surface of the inner tube also comprises two identical side parts 3, 4 which extend axially the radially outer part 2 via connecting regions 8a, 8b so as to connect the primary surface to the radially inner part 5. Each of the side parts 3, 4 has a curvilinear length equal to 15% of the total curvilinear length of said primary surface of the polymeric envelope. Humps 7 are moulded on these sides parts 3, 4 to allow compression in at least the circumferential direction of said part of the primary surface of the polymeric envelope when inflated under the normal conditions of use of the assembled unit, incorporating the inner tube 1 and also consisting of a wheel rim and a tire. It also turns out that the humps 7 thus moulded onto these side parts 3, 4 of the inner tube 1 greatly improve the fitting of the inner tube in the assembled unit by greatly reducing the risk of pinching of the inner tube. The staggered distribution of these humps 7 in two circumferential lines, as shown in FIG. 2a, is among other things particularly beneficial in averting this risk of pinching during fitting. The humps 7 are approximately spherical in shape, with a radius of approximately 2.6 mm. They are extended around their periphery by a connecting region between them and the side parts 3, 4 of the primary surface. During moulding, these side parts 3 and 4 correspond, as FIG. 1 shows, to planar surfaces and the connecting regions can be defined simply without the risk of regions on the surfaces of said side parts 3, 4 becoming stretched during inflation inside an assembly fitted under normal conditions, the smoothness of the joins between the humps 7 and the primary surface ensuring smooth spreading out of the polymeric envelope on the inner surface of the tire.

In accordance with the invention, since the inner tube is inflated to a pressure of 2000 pascals, the side parts 3, 4 have a meridian curvature with an average radius of 165 mm. The ratio of the average radius of the meridian curvature of the side parts to the radius of a circle of perimeter equal to the average meridian perimeter of the primary surface of the polymeric envelope is equal to 12 and therefore greater than 10, when the inner tube is inflated to a pressure of 2000 pascals.

The side parts 3 and 4 are also connected together by a radially inner part 5 of the inner tube 1, the shape of which is not important, and which contacts the well of the wheel rim and the beads of the tire.

Figure 2B:
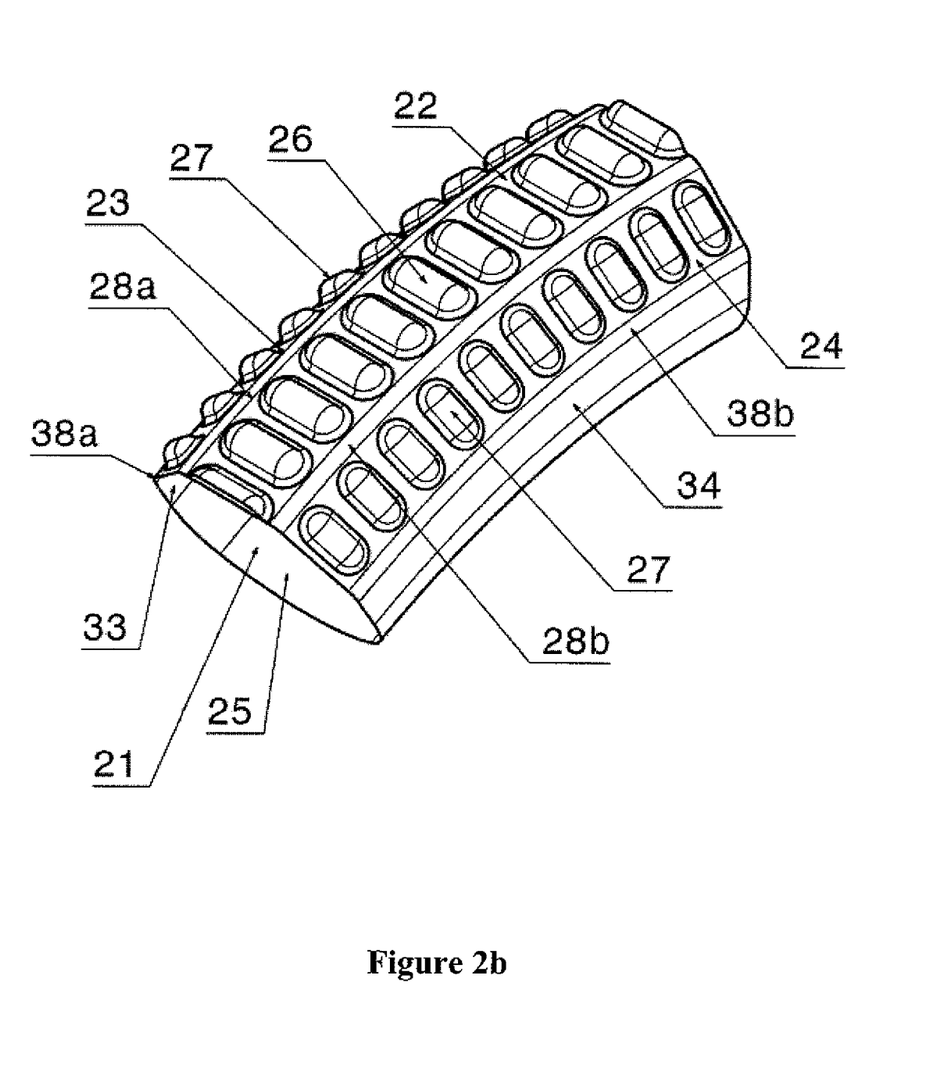

FIG. 2b shows diagrammatically a partial perspective view of an inner tube 21 according to the invention designed to be used with larger assembled units, such as for a motor cycle. In FIG. 2b the inner tube is inflated to a pressure of 2000 Pascals. This low pressure ensures that the shape of the inner tube conferred inside the mould is not totally deformed.

The primary surface is thus composed of ten parts 22, 23, 24, 25, 28a, 28b, 33, 34, 38a and 38b.

The upper part made up of the radially outer part 22, the parts 28a and 28b, the parts 23 and 24, the parts 38a and 38b and the parts 33 and 34 has a curvilinear length of 116 mm, i.e. 53% of the total curvilinear length of 220.7 mm of said primary surface of the polymeric envelope. The radially outer part 22 itself has a curvilinear length of 36 mm, i.e. 16% of the total curvilinear length of said primary surface of the polymeric envelope. Humps 26 are moulded onto the part 22 of this radially outer part.

In accordance with the invention, since the inner tube is inflated to a pressure of 2000 pascals, the radially outer part 22 has a meridian curvature with an average radius of 210 mm. Under the same inflation conditions, the radius of the circle of perimeter equal to the average meridian perimeter of the primary surface of the envelope is 35 mm. The ratio of the average radius of its meridian curvature to the radius of a circle of perimeter equal to the average meridian perimeter of the primary surface of the polymeric envelope is thus equal to 6 and therefore greater than 2.5, when the inner tube is inflated to a pressure of 2000 pascals.

The primary surface of the inner tube comprises two identical side parts 23, 24 which extend axially the radially outer part 22 via connecting regions 28a, 28b whose radius of curvature is less than 6 mm. Each of the side parts 23, 24 has a curvilinear length equal to 13% of the total curvilinear length of said primary surface of the polymeric envelope. Humps 27 are moulded onto the side parts 23, 24.

In accordance with the invention, since the inner tube is inflated to a pressure of 2000 pascals, the side parts 23, 24 have a meridian curvature whose average radius is 202 mm. The ratio of the average radius of the meridian curvature of the side parts to the radius of a circle of perimeter equal to the average meridian perimeter of the primary surface of the polymeric envelope is equal to 5.8 and therefore greater than 2.5, when the inner tube is inflated to a pressure of 2000 pascals.

The primary surface of the inner tube also comprises two identical side parts 33, 34 which extend axially the side parts 23 and 24 via connecting regions 38a, 38b whose radius of curvature is less than 6 mm. Each of the side parts 33, 34 has a curvilinear length equal to 5.5% of the total curvilinear length of said primary surface of the polymeric envelope.

In accordance with the invention, since the inner tube is inflated to a pressure of 2000 pascals, the side parts 33, 34 have a meridian curvature whose average radius is 190 mm. The ratio of the average radius of the meridian curvature of the side parts to the radius of a circle of perimeter equal to the average meridian perimeter of the primary surface of the polymeric envelope is equal to 5.4 and therefore greater than 2.5, when the inner tube is inflated to a pressure of 2000 pascals.

The side parts 33 and 34 are also connected together by a radially inner part 25 of the inner tube 21, the shape of which is not important, and which contacts the well of the wheel rim and the beads of the tire.

The invention should not be understood as being limited to the description of these examples. The shape of the humps and their arrangements on the primary surface of the inner tube may in particular be defined differently.

Also, the inner tube as defined according to the invention may also be provided with liquids, fluids or gels composed of sealing products that are introduced into the inner tube and can help to seal accidental holes which may be too big for the compression of the inner tube surface to be sufficient.

Tests of the invention have been carried out. These have involved fitting inner tubes as described with reference to FIGS. 1 and 2 and performing rolling tests on deliberately puncture-inducing surfaces.

The results are given alongside two control tubes for comparison.

Figure 3:
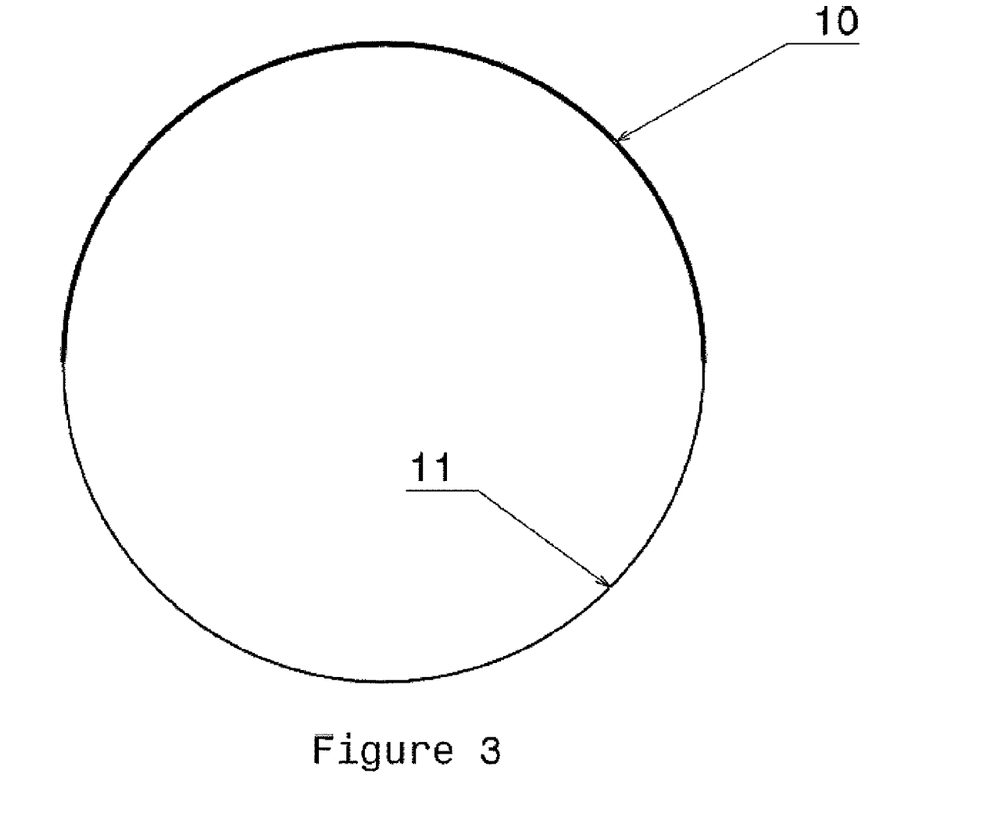
Figure 4:
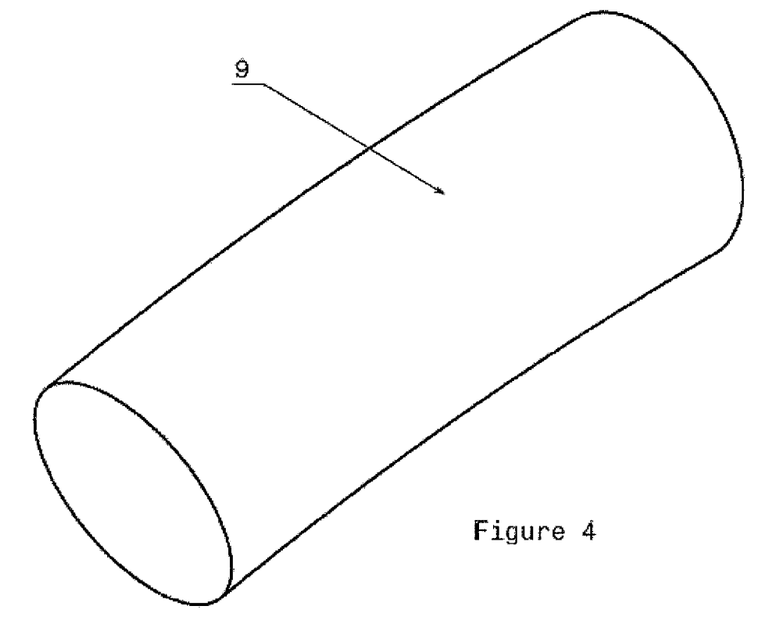

The first control tube is shown in FIGS. 3 and 4. It is an ordinary toroidal-section tube 9. It is composed of a radially outer part 10 and a radially inner part 11. It has no side parts as defined in the invention. The radius of the circle is 13 mm.

Figure 5:
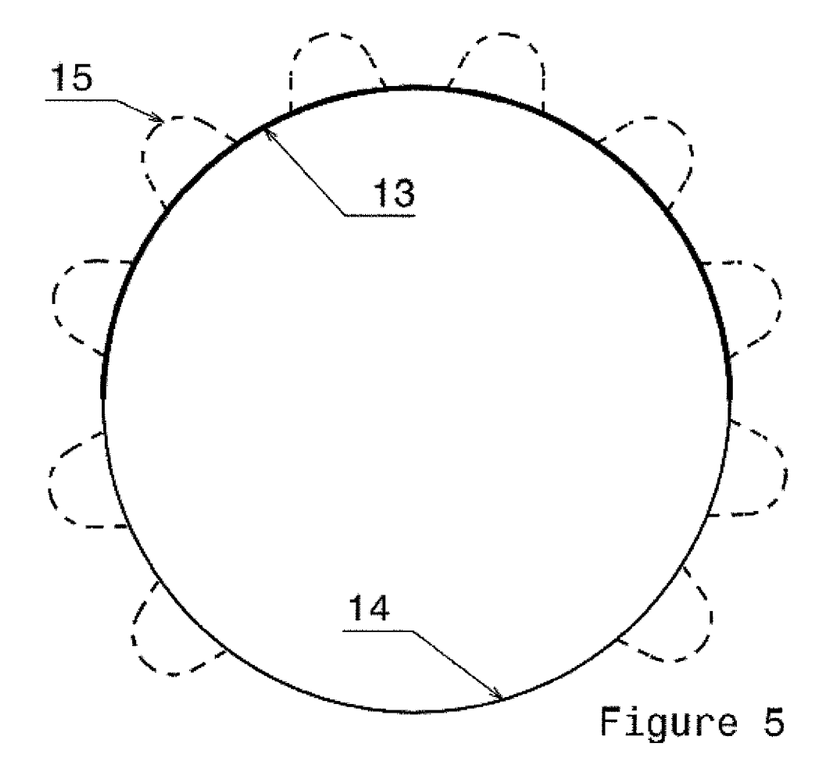
Figure 6:
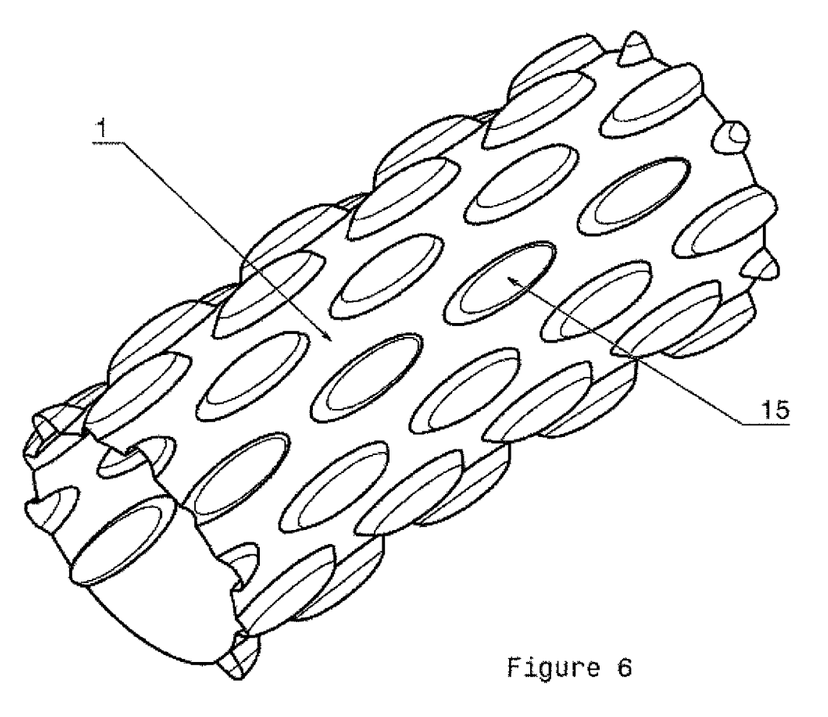

The second control tube is shown in FIGS. 5 and 6. It is a tube 12 with humps on a toroidal surface. The primary surface is a circle of radius 13.55 mm consisting of a radially outer part 13 and a radially inner part 14. These have 1180 humps 15, 10 along the meridian direction and 118 along the circumferential direction. There is no smoothing of the connecting regions between the humps 15 and the primary surface 13-14, unlike the invention.

The three tubes are all of the same thickness, 0.9 mm. The tube 1 according to the invention has a mass of 185 grams. The first control tube 9 has a mass of 168 grams. The second control tube 12 has a mass of 210 grams.

A perforation using joiner's nails of diameter 1.8 mm and length of 30 mm was made in each tested tube and the time in seconds for the pressure to drop from 3.2 bar to 2.2 bar was measured. This was repeated on ten tubes. The following table gives the average time, the longest time and the shortest time obtained:

|  | Tube 1 (invention) | Tube 9 | Tube 12 |
| --- | --- | --- | --- |
| Average time | 865 | 39 | 377 |
| Maximum time | 954 | 45 | 985 |
| Minimum time | 687 | 37 | 97 |

The greatest values obtained with tube 12 are for the case where the perforation took place at the top of a hump 15, while the lowest values are for when they occurred in regions close to the connection between the humps 15 and the primary surface.

What is claimed is:

1. An inner tube for an assembled unit, said tube having a closed polymeric envelope with a primary surface comprising a valve, said primary surface having at least three parts, each of the at least three parts having a curvilinear length in a meridian plane and having means allowing compression in at least the circumferential direction of said part of the polymeric envelope when inflated under normal conditions of use of the assembled unit, wherein the sum of said curvilinear lengths is greater than or equal to 36% of the total curvilinear length of said primary surface of the polymeric envelope in said meridian plane, and wherein the meridian curvature of each of said at least three parts is such that the ratio of the average radius of said meridian curvature to the radius of a circle of perimeter equal to the meridian perimeter of the primary surface of the polymeric envelope is greater than 2.5, when the inner tube is inflated to a pressure of 2000 pascals outside of the assembled unit.

2. The inner tube according to claim 1, wherein each of the at least three parts of the primary surface of the polymeric envelope has a curvilinear length in a meridian plane greater than or equal to 12% of the total curvilinear length of said primary surface of the polymeric envelope in said meridian plane, wherein a radially outer part has a meridian curvature such that the ratio of the average radius of its meridian curvature to the radius of a circle of perimeter equal to the meridian perimeter of the primary surface of the polymeric envelope is greater than 2.5, when the inner tube is inflated to a pressure of 2000 pascals, and wherein two side parts each extend axially inward relative to the radially outer part, each side part having a meridian curvature such that the ratio of the average radius of the meridian curvature to the radius of a circle of perimeter equal to the meridian perimeter of the primary surface of the polymeric envelope is greater than 2.5, when the inner tube is inflated to a pressure of 2000 pascals.

3. The inner tube according to claim 2, wherein said two side parts are connected to said radially outer part by connecting regions having a radius of curvature of less than 6 mm.

4. The inner tube according to claim 2, wherein the primary surface of the polymeric envelope comprises means allowing compression in at least the circumferential direction when inflated under the normal conditions of use of the assembled unit on the radially outer part.

5. The inner tube according to claim 2, wherein the primary surface of the polymeric envelope comprises means allowing compression in at least the circumferential direction when inflated under the normal conditions of use of the assembled unit on the two side parts.

6. The inner tube according to claim 2, wherein means allowing compression in at least the circumferential direction of a part of the polymeric envelope when inflated under the normal conditions of use of the assembled unit are raised forms above the primary surface.

7. The inner tube according to claim 2, wherein means allowing compression in at least the circumferential direction of a part of the polymeric envelope when inflated under the normal conditions of use of the assembled unit are sunken forms below the primary surface.

8. The inner tube according to claim 2, wherein the radially outer part has a curvilinear length in a meridian plane greater than or equal to 18% of the total curvilinear length of the primary surface of the polymeric envelope in said meridian plane.

9. The inner tube according to claim 2, wherein a radially outer part has a meridian curvature such that the ratio of the average radius of its meridian curvature to the radius of a circle of perimeter equal to the meridian perimeter of the primary surface of the polymeric envelope is greater than 10, when the inner tube is inflated to a pressure of 2000 pascals, and wherein the ratio of the average radius of the meridian curvature of the side parts to the radius of a circle of perimeter equal to the meridian perimeter of the primary surface of the polymeric envelope is greater than 10, when the inner tube is inflated to a pressure of 2000 pascals.

10. The inner tube according to claim 2, wherein the radially outer part has a curvilinear length in a meridian plane greater than or equal to 21% of the total curvilinear length of the primary surface of the polymeric envelope in said meridian plane.

11. The inner tube according to claim 1, wherein the meridian curvature of each of said parts is such that the ratio of the average radius of said meridian curvature to the radius of a circle of perimeter equal to the meridian perimeter of the primary surface of the polymeric envelope is greater than 10, when the inner tube is inflated to a pressure of 2000 pascals.

12. The inner tube according to claim 1, wherein for each of the at least three parts, the means allowing compression extends in a pattern which is continuous in the circumferential direction.

13. The inner tube according to claim 1, wherein for each of the at least three parts, the means allowing compression form a pattern which does not extend into a connecting region bordering an adjacent one of the at least three parts.

* * * * *